(12) United States Patent
Gingrich et al.

(10) Patent No.: US 9,650,949 B2
(45) Date of Patent: May 16, 2017

(54) EGR RATE CONTROL FOR INTERNAL COMBUSTION ENGINE WITH DUAL EXHAUST-PORTED CYLINDERS

(71) Applicant: Southwest Research Institute, San Antonio, TX (US)

(72) Inventors: Jess W. Gingrich, San Antonio, TX (US); Raphael F. Gukelberger, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 994 days.

(21) Appl. No.: 13/736,271

(22) Filed: Jan. 8, 2013

(65) Prior Publication Data

US 2014/0190458 A1   Jul. 10, 2014

(51) Int. Cl.
| | |
|---|---|
| *F02B 47/08* | (2006.01) |
| *F02D 13/02* | (2006.01) |
| *F02D 41/00* | (2006.01) |
| *F01N 13/10* | (2010.01) |
| *F02M 26/43* | (2016.01) |
| *F02M 26/05* | (2016.01) |

(52) U.S. Cl.
CPC ............ *F02B 47/08* (2013.01); *F01N 13/107* (2013.01); *F02D 13/0246* (2013.01); *F02D 13/0257* (2013.01); *F02D 41/005* (2013.01); *F02D 41/008* (2013.01); *F02D 41/0065* (2013.01); *F02M 26/43* (2016.02); *F02M 26/05* (2016.02); *Y02T 10/18* (2013.01); *Y02T 10/47* (2013.01)

(58) Field of Classification Search
CPC .... F02D 21/04; F02D 21/08; F02D 2021/083; F02D 41/0047; F02D 41/0065; F02M 25/06; F02M 25/07; F02M 25/0714; F02M 25/0715; F02M 25/0747; F02M 25/0748; F02M 25/0749
See application file for complete search history.

(56) References Cited

U.S. PATENT DOCUMENTS

| | | | | |
|---|---|---|---|---|
| 4,131,095 | A * | 12/1978 | Ouchi ...................... | F02B 1/06 123/3 |
| 6,543,230 | B1 * | 4/2003 | Schmid .............. | F02M 25/0707 123/568.11 |
| 8,539,770 | B2 * | 9/2013 | Williams .................. | F01N 5/02 123/315 |
| 8,701,409 | B2 * | 4/2014 | Pursifull ............. | F02D 13/0207 123/568.12 |
| 8,769,927 | B2 |  7/2014 | Alger, II et al. | |
| 9,316,165 | B2 * | 4/2016 | Akinyemi ........... | F02D 41/0047 |

(Continued)

*Primary Examiner* — Erick Solis
*Assistant Examiner* — Anthony L Bacon
(74) *Attorney, Agent, or Firm* — Livingston Law Firm

(57) ABSTRACT

A method of using exhaust gas recirculation (EGR) in an internal combustion engine. At least two of the cylinders are "dual exhaust-ported cylinders" having two exhaust ports. For each of these cylinders, one of the exhaust ports is connected to the EGR loop and the other of the exhaust ports is connected to the main exhaust line. These cylinders are controlled such that one exhaust port is open and the other exhaust port is closed during each engine cycle, and are operated, on a cycle-by-cycle basis so that all of the exhaust produced by a cylinder may be delivered to the EGR loop at any cycle. The number of cylinders operating as EGR cylinders per engine cycle is in response to a desired EGR rate.

14 Claims, 3 Drawing Sheets

(56) References Cited

U.S. PATENT DOCUMENTS

| | | | |
|---|---|---|---|
| 2004/0050374 A1* | 3/2004 | Aupperle | F02M 25/0707 123/568.12 |
| 2006/0196178 A1* | 9/2006 | Caine | F02D 9/04 60/324 |
| 2011/0000470 A1* | 1/2011 | Roth | F02D 13/0249 123/568.11 |
| 2011/0219750 A1* | 9/2011 | Sakurai | F01N 3/103 60/285 |
| 2012/0000448 A1* | 1/2012 | Freund | F02M 25/0749 123/568.21 |
| 2013/0000614 A1* | 1/2013 | Freund | F02D 21/08 123/568.2 |
| 2013/0220288 A1* | 8/2013 | Klingbeil | F02D 41/0065 123/568.12 |
| 2013/0340728 A1* | 12/2013 | Keating | F02M 25/0717 123/568.11 |
| 2014/0069082 A1* | 3/2014 | Alger, II | F02M 26/43 60/274 |
| 2014/0142833 A1* | 5/2014 | Gingrich | F02D 41/0255 701/103 |

\* cited by examiner

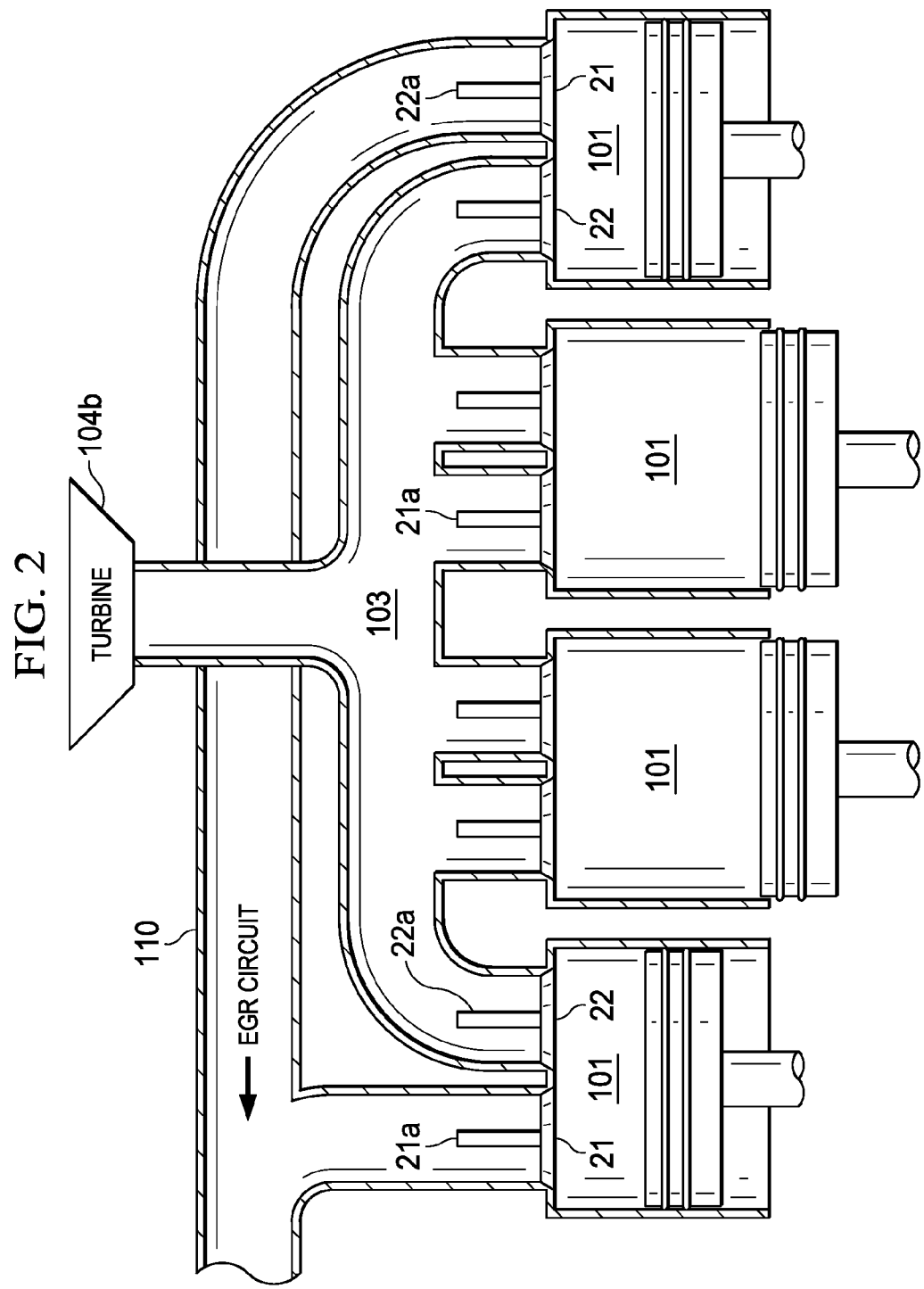

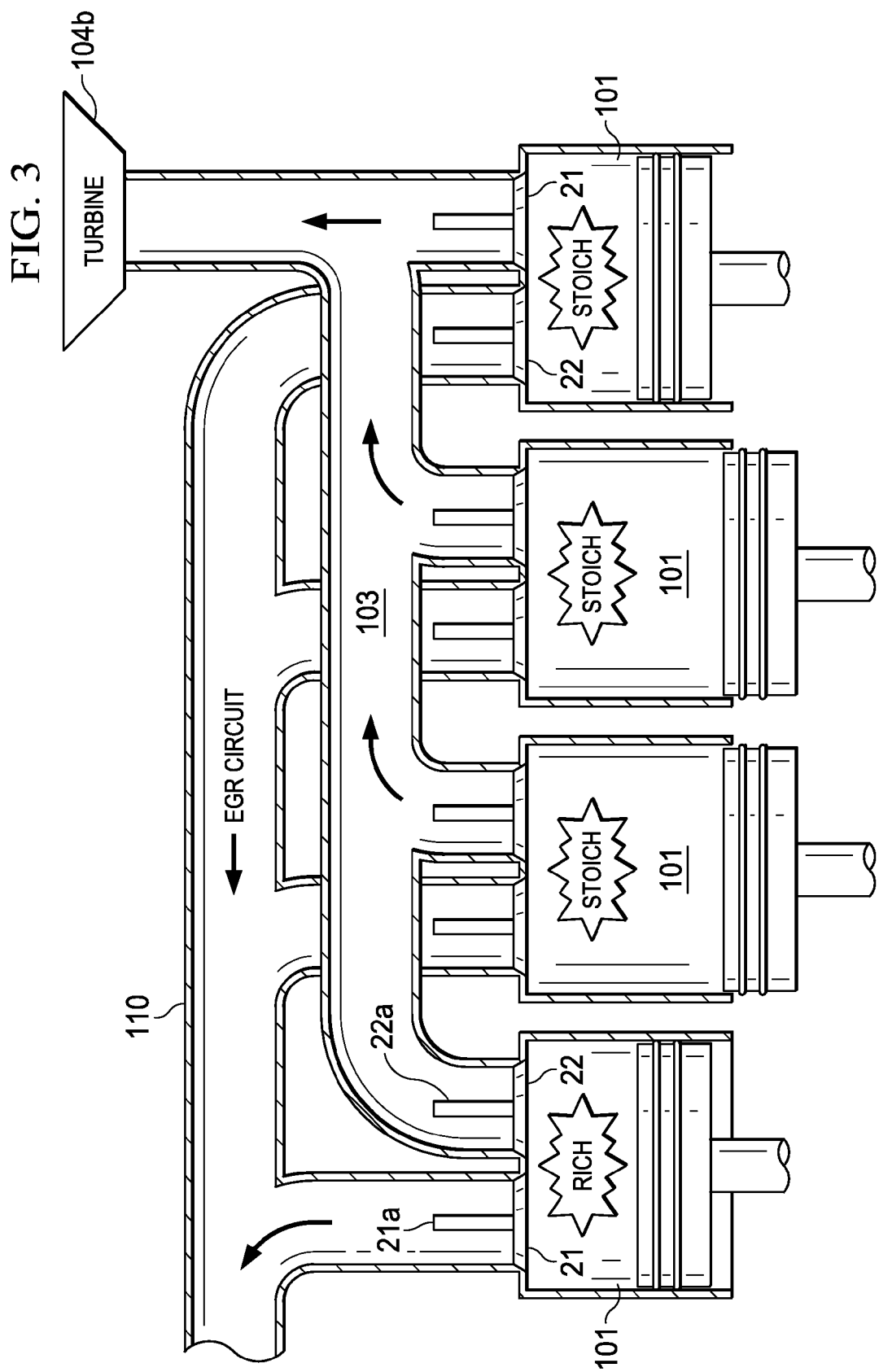

EGR RATE CONTROL FOR INTERNAL COMBUSTION ENGINE WITH DUAL EXHAUST-PORTED CYLINDERS

TECHNICAL FIELD OF THE INVENTION

This invention relates to internal combustion engines, and more particularly to an improved exhaust gas recirculation system for such engines.

BACKGROUND OF THE INVENTION

For many internal combustion engines, their engine control strategy has three important parameters: spark timing (or fuel injection timing in a diesel engine), the exhaust gas recirculation (EGR) rate and the air/fuel ratio (AFR).

To implement EGR, a fraction of the exhaust gas is recycled from the exhaust system back to the intake system. The recirculated exhaust gas is mixed with the fresh fuel-air mixture before entering the cylinders. EGR can be implemented in internal and external configurations. External configurations can be implemented as either a high pressure or low pressure loop, depending on whether the recirculated exhaust is introduced to the intake post compressor (high pressure loop) or pre-compressor (low pressure loop).

EGR has a long history of use in both diesel and spark-ignited engines for reduction of NOx emissions. It affects combustion in several ways. The combustion is cooled by the presence of exhaust gas, that is, the recirculated exhaust gas absorbs heat. The dilution of the oxygen present in the combustion chamber reduces the production of NOx. Also, if exhaust gas is being recirculated, less air is breathed by the engine at a given intake manifold pressure. The engine is more efficient with EGR and consumes less fuel for a given power output. The lower fuel rate at a constant air-fuel ratio necessitates a lower air flow rate and therefore lower exhaust flow rate.

As a relatively simple and low cost technology, EGR can be expected to be widely used on all types of engines. Of particular interest is that EGR can reduce the need for fuel enrichment at high loads in turbocharged engines and thereby further improve fuel economy.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates an example of an engine having four cylinders with dual exhaust ports, with two being used for "split" exhaust.

FIG. 3 illustrates an alternative embodiment in which all cylinders have dual exhaust ports, with all being used for "split" exhaust.

DETAILED DESCRIPTION OF THE INVENTION

Figure 1:
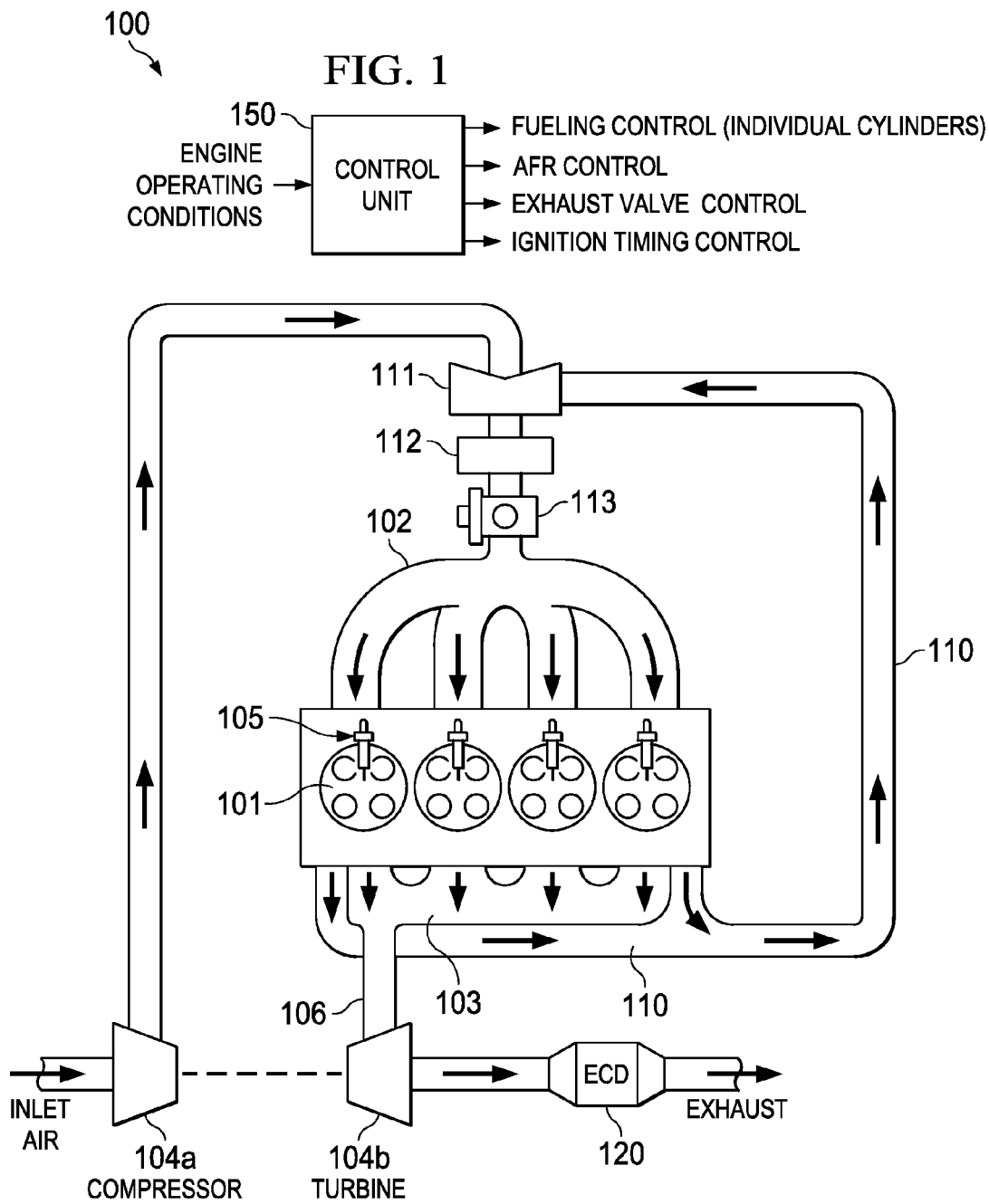
FIG. 1 illustrates an example of an engine having two cylinders with dual exhaust ports.

As described in the Background, EGR has significant advantages for internal combustion engines. The embodiments described below add control over EGR composition as another important variable to the engine control strategy. In conventional engines, EGR composition is equivalent to the engine-out exhaust composition. The EGR system and control method herein disconnect the EGR gas from the tail-pipe exhaust. By doing so, EGR composition can be controlled to positively impact engine performance and efficiency.

A recent development in the area of exhaust gas recirculation (EGR) for internal combustion engines is the use of one or more of the engine's cylinders as a "dedicated EGR" cylinder. The exhaust of the dedicated EGR cylinder(s) is routed back to the intake of all the cylinders, thereby creating EGR for all cylinders with the exhaust of a few. The dedicated EGR cylinder(s) can operate at any equivalence ratio since its exhaust will never exit the engine before passing through other cylinder(s), whose engine-out exhaust is treated with an appropriate exhaust aftertreatment system. This allows the dedicated EGR cylinder(s) to run rich and produce hydrogen ($H_2$) and CO, which in turn enhances the flame speeds, combustion and knock tolerance of all cylinders. U.S. Pat. No. 8,291,891, entitled "EGR System with Dedicated EGR Cylinders", to Alger, et al, discusses dedicated EGR and is incorporated by reference herein.

The following description is directed to an exhaust system and method that is similar to a dedicated EGR system in that the EGR exhaust composition may be different from the engine-out exhaust composition. However, the exhaust system's configuration and control scheme is designed for flexibility in the EGR rate over the engine operating range. As explained below, one or more of the cylinders has dual exhaust ports and dual exhaust valves. This "dual exhaust-ported cylinder" configuration allows exhaust to be directed to either an EGR loop or to the engine's main exhaust line. The cylinders that are producing exhaust for the EGR loop may be controlled to provide an EGR composition for enhanced combustion. The two circuits (EGR loop and main exhaust line) allow any number or none of the cylinders to produce EGR at any given engine cycle.

FIG. 1 illustrates one embodiment of an internal combustion engine 100 having four cylinders 101, two of which have dual exhaust ports and dual exhaust valves. These dual exhaust-ported cylinders may be operated so that one of their exhaust valves is open to either the main exhaust line 106 or to the EGR loop 110 and the other exhaust valve is closed. The main exhaust line 106 and the EGR loop 110 are not in any fluid communication with each other, such that each cylinder has its two exhaust ports connected to entirely separate exhaust flow paths.

The cylinder exhaust valve that opens to the main exhaust line 106 is referred to herein as the "main exhaust valve". The cylinder exhaust valve that opens to the EGR loop 110 is referred to herein as the "EGR exhaust valve".

In the example of this description, engine 100 is spark ignited, and each cylinder 101 has an associated spark plug 105. However, the methods described herein are also suitable for use with compression ignited engines.

As explained below, each cylinder's dual exhaust valves are separately controlled on a cycle-by-cycle basis. Thus, at any engine cycle, one or the other exhaust valve is open. Further, at any engine cycle, all or some or none of the cylinders' EGR exhaust valve may be open to the EGR loop. If the EGR exhaust valve is not open to the EGR loop, its main exhaust valve is open to the main exhaust line. Thus, at any given cycle, a cylinder may be operating as an "EGR cylinder" or a "main exhaust cylinder".

When operating as a main exhaust cylinder, in some embodiments, a cylinder is run stoichiometrically. In other embodiments, a main exhaust cylinder may be run lean.

When operating as an EGR cylinder, a cylinder can operate at any equivalence ratio because its exhaust will not exit the engine before passing through a cylinder acting as a main exhaust cylinder. An EGR cylinder is typically run rich to provide EGR with a composition that is beneficial to engine operation, such as by improving combustion.

Although not explicitly shown, the cylinders have some sort of means for introducing fuel into the cylinders, such as fuel injectors. The main fuel delivery system can be fumigated, port injected, or direct injected.

In the example of this description, engine 100 is equipped with a turbocharger, specifically a compressor 104a and a turbine 104b. In other embodiments, the engine may be air-boosted by other means or not air-boosted, such that exhaust is directly to the main exhaust line 106 rather than via a turbine.

The main exhaust line 106 is equipped with one or more emissions control devices (ECD) for exhaust aftertreatment. The type of aftertreatment device is appropriate for the exhaust composition. Thus, where the main exhaust cylinders are run stoichiometrically, the ECD could be a three way catalyst. Where the main exhaust cylinders are run lean, the ECD could be a NOx trap or NOx adsorber.

The EGR line 110 joins the intake line at a mixer 111. The mixture of recirculated exhaust and fresh air is cooled with a cooler 112. A throttle 113 is used to control the amount of intake into the intake manifold 102.

FIG. 2 illustrates four cylinders 101, each having dual exhaust ports 21 and 22 from its combustion chamber. Each port 21 and 22 has its own valve 21a and 22a, which can be controlled independently on a cycle by cycle basis.

As in FIG. 1, in FIG. 2, for each of two cylinders, the exhaust is "split", such that one exhaust port 21 communicates with the EGR loop 110 and one exhaust port 22 communicates with the main exhaust line 106 via turbine 104b. These two cylinders may operate as EGR cylinders or main exhaust cylinders, depending on the open or closed state of their exhaust valves. As stated above, beyond the exhaust valves, the EGR loop and main exhaust lines are fully separated. The EGR loop 110 is routed to the intake to provide dilution for all the cylinders. The main exhaust line, via a turbine 104b, exits through an aftertreatment system before exiting the tailpipe.

The other two cylinders 101 deliver their exhaust to only the main exhaust line 106, via turbine 104b. These cylinders are shown as having dual exhaust ports, with both ports operable to deliver exhaust to the main exhaust line (typically open or closed simultaneously). However, these cylinders could also be implemented with a conventional single exhaust port.

FIG. 3 illustrates an alternative embodiment, in which each of four dual exhaust-ported cylinders may deliver exhaust to either the EGR loop 110 or to the main exhaust line 106. In other words, each cylinder may operate as an EGR cylinder or as a main exhaust cylinder, depending on the open or closed state of its exhaust valves. Other than the number of cylinders available for use as EGR cylinders, the configuration of FIG. 3 is similar to the configurations of FIGS. 1 and 2.

Referring to both FIGS. 2 and 3, at least one exhaust valve per cylinder is connected to the EGR loop and at least one exhaust valve is connected to the turbine of a turbocharger or the tail pipe if a turbocharger is not used. All of an engine's exhaust valves may be dual exhaust-ported or only some. And all or a subset of the dual exhaust-ported valves may be used for "split" exhaust.

Either embodiment or modifications thereof, can be used to produce any EGR rate. At any engine cycle, a subset of the dual exhaust-ported cylinders or all of them or none of them may be used to produce EGR. For example, for an EGR rate of 25%, 50% of the cylinders may be used 50% of the time to produce EGR. Or, 100% of the cylinders could be used 25% of the time to produce EGR. Both EGR rate control strategies produce the same effective EGR rate, but change the EGR source from one cylinder to another. Using control methods described herein, various dual exhaust-port configurations can be used to vary EGR rates while retaining good engine performance and cylinder to cylinder balance.

Each exhaust valve is equipped with collapsible valve lifters or a fully independent valve system, e.g. an electromagnetic valve system. The exhaust valve operation can be implemented with a fixed cam profile and a loss motion mechanism, or a full variable valve timing or actuation (VVT or VVA) mechanism. The cylinders may also be equipped with intake valve mechanisms to restrict gas flow in the cylinder that will be used to create EGR, such as intake VVT or VVA.

Downstream the dual exhaust ports, the exhaust manifold configuration may vary, so long as there are separate paths for the EGR loop and main exhaust line. The exhaust manifolds may be the common "log style" configuration. Alternatively, many engines use a manifold that segregates cylinders 1 and 4 and 2 and 3 all the way into the turbine. This type of split manifold and twin-scroll turbocharger configuration may also be used.

Referring again to FIG. 1, the engine system further has a control unit 150, which controls the exhaust ports for every cylinder on every engine cycle. Control unit 150 has appropriate processing hardware and programming to implement the various control methods described herein. These control methods determine which exhaust port will open, and therefore control the flow out the two separate circuits (EGR loop and main exhaust line) during a given engine cycle.

As indicated in FIG. 1, and as further explained below, control unit 150 may generate cylinder valve control signals, air-fuel ratio control signals and ignition timing control signals. It may receive various data representing engine conditions that it will use to determine an associated EGR rate, and then generate control signals accordingly. The control unit 150 can be programmed to access memory that stores EGR rate maps or other data, such that a desired EGR rate can be accessed in response to current engine operating conditions.

Based on a schedule of which cylinder will exhaust through which exhaust system, control unit 150 is programmed to control the fueling and spark timing for each cylinder at every cycle. A cylinder that is exhausting through the EGR circuit can be over-fueled (run rich) to produce high quality EGR. The other cylinders produce exhaust compatible with the main exhaust line's aftertreatment system, which is equipped according to whether these other cylinders are run stoichiometrically or lean.

A first EGR control strategy allows the EGR flow to be turned off for any or all cylinders. This results in more pre-turbine enthalpy at operating conditions where such a situation is beneficial to the engine system. However, the EGR exhaust valves may at any time be re-opened to revert back to high dilution, high efficiency operation. By separating the exhaust paths, all exhaust gases can be routed pre-turbine when the EGR circuit valve is closed and therefore stop flowing EGR while maximizing pre-turbine enthalpy.

Another EGR control strategy is alternating the cylinder(s) that produce EGR. These EGR cylinders are alternated by individually controlling their exhaust valves and thereby the flow paths associated with each cylinder. The EGR exhaust valve opening schedule can be expressed mathematically as follows:

$$a_{cyl\_n,i} = b + c*i \text{ for } i=0 \rightarrow \infty,$$

where:
- n=number of specific cylinder
- a=cycle number when cylinder n will open its EGR exhaust valve
- i=an increasing integer
- b=firing order of cylinder n
- c=total number of cylinders As an example, an inline 4-cylinder engine with the firing order 1-3-4-2 will have the following EGR valve opening schedules:

$$a_{cyl\_1,i} = 1 + 4*i$$

$$a_{cyl\_2,i} = 4 + 4*i$$

$$a_{cyl\_3,i} = 2 + 4*i$$

$$a_{cyl\_4,i} = 3 + 4*i$$

As stated above, an EGR producing cylinder may be run with a rich A/F ratio to produce exhaust that is especially suitable for EGR. Specifically, the exhaust from rich combustion contains more H2 and CO. The fueling schedule may adhere to the exhaust valve opening schedule set out above. Operating a cylinder rich can decrease combustion and exhaust port temperatures by more than 50° C. Alternating rich-operated EGR cylinder(s) from cycle to cycle decreases the thermal loads on the cylinder head design, improves engine efficiency by reducing heat losses and provides better knock mitigation.

Another control strategy is to vary the EGR rate. By means of the dual exhaust ports, and cycle-to-cycle and cylinder-to-cylinder exhaust valve control, EGR rates can be varied. The overall strategy is to operate periodically more or fewer EGR generating cylinders. For example, in a 4-cylinder engine, if one cylinder were dedicated as a 100% EGR cylinder, the maximum EGR rate would be 25%. By having another cylinder generating EGR every fourth engine cycle, the overall EGR rate can be increased to 31.25%.

The ratio of engine cycles that a cylinder operates as an EGR cylinder to the engine cycles that it operates as a main exhaust cylinder is referred to as its "EGR frequency". Depending on the number of EGR cylinders and their EGR frequency, the effective amount of EGR can be varied to meet the requirements of the engine operating condition.

The above-described control strategies can be combined. Thus, an engine in operation may at times have its EGR turned off, its EGR cylinders may be alternated, and the EGR rate can be varied. Along with controlling the exhaust valve actuation, control over the preceding combustion event is performed to produce the desired air-fuel ratio for whichever circuit (EGR or main exhaust) the combustion products will be exhausted into.

In sum, instead of fixed EGR rates based on a fixed hardware configuration, a control strategy can be used to change from 0% EGR up to the engine's EGR tolerance limit, with high resolution in EGR increments. Adding a means to limit the intake and/or outflow of the EGR cylinder(s) can further improve the resolution in EGR rate while maintaining the benefits of high quality EGR. The control unit 150 can be programmed to control the EGR rate on a cycle-by cycle- and cylinder-by-cylinder basis based on desired EGR flow, boost requirement, efficiency.

Control unit 150 may be programmed to control the EGR rate by controlling which cylinders are to act as EGR cylinders and the engine cycles when they will act as such. When a cylinder is to be used as an EGR cylinder, it can be run at an air-fuel ratio and ignition timing different than what is needed for the aftertreatment system. When a cylinder is designated to have its exhaust flow to the main exhaust line, its air fuel ratio and ignition timing is set for the exhaust aftertreatment system.

What is claimed is:

1. A method of using exhaust gas recirculation (EGR) in an internal combustion engine having a number of cylinders, at least two of the cylinders being "dual exhaust-ported cylinders" having two exhaust ports, the engine further having an EGR loop and a main exhaust line, comprising:
    for at least two dual exhaust-ported cylinders, connecting, via exhaust valves, one of the exhaust ports to the EGR loop and the other of the exhaust ports to the main exhaust line;
    controlling the at least two dual exhaust-ported cylinders such that during each engine cycle, only one exhaust valve is opened and the other exhaust valve is closed;
    determining, for a selected engine cycle, one or more of the dual exhaust-ported cylinders to be operated as EGR cylinder(s), such that all of the exhaust produced by that cylinder is delivered to the EGR loop;
    operating the engine by providing the EGR cylinder(s) with air and fuel at a greater air-fuel ratio than the other cylinders;
    repeating the operating step for successive engine cycles, such that whether or not at least one of the cylinders is operated as an EGR cylinder varies at least once from one cycle to another, and such that where n is the number of dual exhaust-ported cylinders, each dual exhaust-ported cylinder is operated as an EGR cylinder no more frequently than every nth engine cycle.

2. The method of claim 1, wherein the engine is a spark ignited engine.

3. The method of claim 1, wherein the engine is a compression ignited engine.

4. The method of claim 1, wherein all of the engine cylinders are dual exhaust-ported cylinders, and all or a subset of the cylinders are operated as EGR cylinders for selected engine cycles.

5. The method of claim 1, wherein all of the engine cylinders are dual exhaust-ported cylinders, and a subset of the cylinders have both exhaust ports connected to the main exhaust line.

6. The method of claim 1, wherein all of the engine cylinders are dual exhaust-ported cylinders, and all cylinders are connected to both the EGR loop and the main exhaust line via the exhaust valves.

7. The method of claim 1, wherein the number of cylinders operating as EGR cylinders per engine cycle is in response to one or more desired EGR rates.

8. An improved dual exhaust-ported internal combustion engine, the engine having multiple cylinders, an EGR loop and a main exhaust line, comprising:
    at least two dual exhaust-ported cylinders having two exhaust ports;
    wherein, for the at least two dual exhaust-ported cylinders, one of the exhaust ports is connected, via an EGR exhaust valve, to the EGR loop and the other of the exhaust ports is connected, via a main exhaust valve, to the main exhaust line;

memory for storing EGR rate data that provides desired EGR rates in response to input data representing engine operating conditions;

a control unit programmed to control each dual exhaust-ported cylinder such that only one exhaust port is open and the other exhaust port is closed during each engine cycle, such that during that cycle, the dual exhaust-ported cylinder is either an EGR cylinder providing all exhaust to the EGR loop or a main cylinder providing all exhaust to the main exhaust line; to further control each dual exhaust-ported cylinder such that the number of EGR cylinders varies at least once from one cycle to another, and such that where n is the number of dual exhaust-ported cylinders, each dual exhaust-ported cylinder is operated as an EGR cylinder no more frequently than every nth engine cycle; and to provide an air-fuel ratio to the EGR cylinders that is richer than that of the main cylinders.

9. The system of claim 8, wherein the engine is a spark ignited engine.

10. The system of claim 8, wherein the engine is a compression ignited engine.

11. The system of claim 8, wherein all of the engine cylinders are dual exhaust-ported cylinders, and all or a subset of the cylinders are operated as EGR cylinders for selected engine cycles.

12. The system of claim 8, wherein all of the engine cylinders are dual exhaust-ported cylinders, and a subset of the cylinders have both exhaust ports connected to the main exhaust line.

13. The system of claim 8, wherein all of the engine cylinders are dual exhaust-ported cylinders, and all cylinders are connected to both the EGR loop and the main exhaust line via the exhaust valves.

14. The method of claim 1, wherein the step of repeating the operating step is further performed by alternating which of the cylinders is to be operated as the EGR cylinder(s).

* * * * *